United States Patent [19]

Henke et al.

[11] Patent Number: 4,462,383
[45] Date of Patent: Jul. 31, 1984

[54] IMPINGEMENT FOOD PREPARATION APPARATUS

[75] Inventors: Mitchell C. Henke; Gordon D. Bell, both of Fort Wayne, Ind.; Donald P. Smith, Dallas; Virgil L. Archer, Irving, both of Tex.

[73] Assignee: Lincoln Manufacturing Company, Inc., Fort Wayne, Ind.

[21] Appl. No.: 386,609

[22] Filed: Jun. 9, 1982

[51] Int. Cl.³ .............................................. A21B 1/00
[52] U.S. Cl. .................................. 126/21 A; 34/160; 34/225; 99/443 C; 99/468; 99/476; 165/DIG. 25; 219/388; 219/400; 415/213 C; 426/314; 426/523; 432/145
[58] Field of Search ................ 126/15 A, 21 A, 39 R; 417/424; 34/160, 216, 225; 432/145, 199; 99/386, 401, 467, 468, 473-477, 443 C; 62/237, 404, 374, 376, 380; 219/388, 400; 165/DIG. 25, DIG. 26, 121, 122, 124, 126, 127; 426/314, 455, 456, 458, 465, 466, 523; 415/213 C

[56] References Cited

U.S. PATENT DOCUMENTS

| | | | |
|---|---|---|---|
| 3,294,315 | 12/1966 | Stewart et al. | 415/213 C |
| 3,324,571 | 6/1967 | Stock | 34/160 |
| 3,401,869 | 9/1968 | Doyle | 417/423 R |
| 4,132,216 | 1/1979 | Guibert | 126/21 A X |
| 4,197,659 | 4/1980 | Brinkhaus et al. | 34/160 X |
| 4,252,055 | 2/1981 | Johansson et al. | 99/443 C X |
| 4,335,646 | 6/1982 | Jacquet et al. | 417/424 X |
| 4,338,911 | 7/1982 | Smith | 126/21 A X |
| 4,354,549 | 10/1982 | Smith | 126/21 A X |
| 4,377,109 | 3/1983 | Brown et al. | 126/21 A X |

*Primary Examiner*—Samuel Scott
*Assistant Examiner*—Margaret A. Focarino
*Attorney, Agent, or Firm*—Albert L. Jeffers; John F. Hoffman

[57] ABSTRACT

An oven for preparing food comprising an enclosure having a conveyor received therethrough for conveying food to be prepared through the enclosure. Positioned within the enclosure and about the conveyor portion therein are duct devices for impinging heated air against the food product, a plenum adapted to the duct devices for supplying heated air to the duct devices, and an impeller assembly for recirculating the air within the enclosure for reheating and subsequent passage to the plenum and duct devices. A heating source is provided within a heating chamber on the opposite side of the plenum from the duct devices, and control components are provided for regulating the temperature of the heat source. The impeller assembly and the plenum are unique in that air drawn from the heating chamber by the impeller assembly is axially and radially urged into the plenum for substantially uniform distribution to the duct devices communicating with the plenum. The impeller assembly and the plenum also uniquely provide for the air flow to be reversed in a very short distance. Furthermore, the structure of the impeller assembly and plenum provide at various points tapering walls, which permit air to flow thereover in a non-turbulent manner, thereby eliminating dead spots or stagnant air pockets.

Further novelty of the present invention exists in the conveyor assembly wherein an adjusting mechanism is provided at one end of the conveyor frame for adjusting the slack or tension of a continuously moving wire-link belt.

17 Claims, 15 Drawing Figures

1

IMPINGEMENT FOOD PREPARATION APPARATUS

BACKGROUND OF THE INVENTION

This invention pertains to a food preparation device and more particularly to an oven for preparing foods such as pizza, pasta products, sandwiches, breakfast meats, cookies, breads, and other similar foods of relatively shallow thickness, and to apparatus for the freezing of foods.

Several types of ovens are available in the market for cooking foods, the two most popular types being the deck oven and the convection oven. In the deck oven, the food is placed within the oven on a shelf, under which a heat source is located for cooking the food. Several drawbacks exist with the deck oven, one of which is the requirement of having to manually load the unprepared food within the oven, and then manually unload the food after it has been cooked. The manual loading and unloading of the food does not allow for rapid food preparation during high peak periods. Another drawback associated with the deck oven is high energy consumption. Since the deck oven cooks primarily by heat conduction through the shelf, and not by convection, increased energy usage results from having to maintain the shelf area upon which the food is located at the required temperature in order to prepare the food. Furthermore, since the cooking is primarily by heat conduction, it is difficult to regulate the temperature within the deck oven in order to cook foods having different cooking temperatures and cooking times.

Convection ovens, unlike deck ovens, naturally cook by heat convection instead of heat conduction. Although convection ovens use less energy than deck ovens, they still require a disproportionate amount of energy in order to cook the food since additional energy is required to heat all of the air within the oven, which results in cooking by convection. Like the deck oven, the convection ovens also require manual loading and unloading of the food product within the oven, thereby preventing rapid preparation of food during high peak periods. Another drawback of the convection oven, similar to the deck oven, is that it is not easily adaptable to cook different foods having various cooking temperatures and cooking times. This results from the cooking by convection process, which requires all of the oven air to be either cooled below its present temperature or heated above its present temperature in order to meet the heating requirement of the particular food. Naturally, this repeated cooling and reheating process produces undesirable energy consumption.

Because of the aforementioned drawbacks of the deck and convection ovens, peak periods during which food delivery demands are highest can only be met by having several ovens available, each operated at a particular temperature for a particular type of food. Consequently, the drawbacks of each individual oven, for example, high energy consumption and manual operation, are magnified by the number of additional ovens required.

In those cooking ovens which recirculate air by means of an impeller and plenum assembly for reheating and subsequent use in the cooking process, several problems and disadvantages exist with these ovens. In the majority of these ovens, the impeller withdraws air from the cooking area and recirculates it over a heat source from which it is drawn and directed into a plenum for distribution to various duct devices, which direct the air to the product to be cooked. A prerequisite for an evenly cooked food product is the uniform distribution of reheated air by the impeller assembly through the plenum and duct devices. In order for the impeller assembly to radially and axially distribute heated air uniformly within the plenum for subsequent uniform distribution through the duct devices, the reheated air upstream of the impeller should follow a path to the impeller that is generally parallel to the longitudinal axis of the impeller and approximately two to three feet in length. This results in the reheated air being drawn by the impeller along a path substantially perpendicular to the impeller's plane, thereby permitting the impeller to uniformly distribute the reheated air through the plenum and to the duct devices. These ovens which utilize such an impeller and plenum assembly, and which provides a sufficiently long air flow path in front of the impeller, are longer in length than required and therefore take up needed space.

A further disadvantage of this increased length of the oven is that it requires the air to be heated to travel a longer distance to and through the heating air. This increased distance the air must travel causes the air to lose excess heat energy to its environment, which can only be remedied by increasing the heat source temperature. This, of course, is an undesired increase in energy consumption.

Attendant also with the increase in length of the oven is the problem with noise resulting from the reinforcement of reverberations of the moving parts located within the enlarged areas of the oven.

This application relates to certain improvements over the food preparation apparatus claimed in copending application Ser. No. 359,921, filed Mar. 19, 1982 in the name of Donald P. Smith and Virgil L. Archer. The finger support structure of FIGS. 10–13 is claimed in copending application Ser. No. 386,610, filed June 9, 1982, in the name of Daniel S. Kaminski.

SUMMARY OF THE INVENTION

The drawbacks and disadvantages accompanying prior art devices are eliminated by the present invention which provides automated cooking apparatus to provide exceptional food product quality in far less time than the other prior art devices. In particular, the present oven provides a variable speed conveyor system which moves food products through the oven sequentially, thereby eliminating the need of manually loading and unloading the food product within the oven, while improving product flow during the cooking process. The conveyor system generally comprises a continuously movable belt adjustably supported within a frame, which extends through the heating area, and has a drive mechanism connected to one end for moving the belt. Because that belt is preferably made of a wire-link belting, the food product is quickly cooked since it receives heating on both its top and bottom portions. Furthermore, additional cooking flexibility is provided by adjusting the speed of the conveyor belt to provide the food a cooking time of between, for example, two and one-half to twenty minutes. The conveyor system, therefore, permits a continual food product flow through the heating area without manual intervention.

The present invention consumes less energy than certain prior art ovens by recycling heated air to the heating source, thereby eliminating the requirement of heating outside cool air for cooking purposes and allowing the heating source to operate at lower temperatures. Heated air impinging the food product is withdrawn from the cooking area by a specially designed fan to be reheated by the heat source, and then forced through a plenum chamber to a series of ducts, which extend into the heating area about the conveyor belt and have a plurality of focused jet ports or slots therein for directing the heated, high velocity air streams onto the food product carried on the conveyor. A suitable duct for directing the high velocity, heated air against the food product is disclosed in U.S. Pat. No. 4,154,861, which patent is incorporated by reference herein.

A very interesting and unique feature of the oven of the present invention eliminates the increased length of the oven required by the impeller and plenum assembly for uniform heated air distribution to the duct devices. The consequences of this unique feature is a smaller oven, decreased air flow travel and therefore decreased energy consumption, and a substantial decrease in noise. This feature comprises a cylindrical collar peripherally mounted about a hole centrally disposed through the plenum and having a dome-shaped impeller mounted within the collar with the dome portion of the impeller facing away from the plenum. A plurality of blades are mounted on the impeller, and a shroud is mounted just upstream of the impeller and tapers radially outwardly therefrom to the enclosure back wall. The two to three foot length requirement above is reduced to approximately four to six inches because of the cooperating effects of the collar, dome-shaped impeller, and the tapering shroud. Air is drawn by the impeller from the cooking area over the plenum and into the heating area where it is smoothly redirected by the tapering shroud to the impeller, and, due to the cooperating effects of the collar positioned about the impeller and the tapering shroud, the air directed toward the impeller is substantially parallel to the side of the tapering shroud, thereby allowing the dome-shaped impeller to axially and radially distribute the air through the plenum for uniform distribution to the duct devices. Because the collar, the impeller within the collar, and a portion of the tapering shroud occupy only a space approximately four to six inches long, the oven is smaller, quieter, and more energy efficient than prior art ovens which utilize earlier impeller and plenum assemblies.

A further advantageous feature of the present invention is the rapidity and flexibility with which different foods may be prepared. A food product is more rapidly prepared since it is not primarily cooked by conduction or convection, but rather by the impinging, or blasting, effect of the high velocity, heated air against the food product. The impinging effect penetrates the boundary layer of the air encircling the food product and cooks the food more efficiently, and, because the air concentrates heat on the product, greater heat transfer rates occur between the heated air and the food product. Furthermore, since the high velocity air impingement process is tolerant enough for sensitive, low density food products, it is able to effect proper crisping and browning of the food product.

The flexibility of the present invention in preparing food products is apparent by the capability of varying the speed of the conveyor system and the temperature of the heating source. The required cooking environment needed to produce a properly prepared food product may be met by maintaining the temperature of the air constant and varying the speed of the conveyor system, maintaining the speed of the conveyor system constant and varying the temperature of the heating source, or varying both the conveyor speed and temperature of the heat source. Because of the relatively shallow thicknesses of the food products to be prepared by the present invention, any one of the above three means may be used to properly prepare the food product.

Broadly stated, the present invention provides a food preparation oven comprising an enclosure having front and rear openings and a horizontally disposed passageway therethrough, which is in alignment with the openings, and through which is received a conveyor device for conveying food to be cooked through the enclosure. A plurality of duct devices are mounted within the enclosure and in vertical alignment with and spaced apart from the conveyor device for directing therethrough heated air for subsequent exiting through a plurality of jets in the duct device and impingement on the food supported by the conveyor. The heated air is provided to the duct devices by a plenum having a front portion with a plurality of openings in fluid commuication with the duct devices and also having a rear portion with a rear opening, which has peripherally disposed thereabout a collar. An impeller is positioned within the collar such that an annular surface of the collar extends axially relative to the impeller and draws the heated air through the rear opening into the plenum for subsequent passage to the duct devices. The plenum is positioned within the enclosure so that a space or chamber exists between the plenum and the enclosure to permit the air which has exited the jets to flow around the plenum and then into the plenum through the collar. This reversal of the air flow within this space or chamber is further assisted by a shroud having a surface which is in close proximity to and at least partially rearwardly of the collar for directing the return air into the collar. Also provided within the enclosure is a heating device for reheating the recirculated air prior to its being drawn by the impeller through the collar into the plenum.

The area within the enclosure defined by the plenum, the impeller, and the shroud is of primary importance to the efficient operation of the oven. After the heated air exits the ducts and impinges the food product on the conveyor, it is withdrawn to the rear of the enclosure by the impeller. After the air flows over the top and bottom portions of the plenum, it enters the rear portion of the enclosure where it is reheated and undergoes a complete reversal of direction upon contacting the enclosure back wall and the sides of the shroud. The shroud causes the air flow reversal to be made in a non-turbulent manner to prevent the creation of dead or stagnant air flow, and the collar serves to direct the air flow substantially perpendicular to the plane of the impeller. Reiterating, the air flow generally requires a two to four foot length of travel prior to the impeller in order to be flowing substantially perpendicular to the impeller plane. The purpose of the above structure is to eliminate the required two to four foot length of travel and yet still direct the air flow as required. Upon contacting the convex surface of the impeller, the axially and radially by the impeller into the plenum for uniform distribution to the series of ducts in communication with the plenum chamber. The uniform distribution of heated air to the series of ducts is necessary for uniform cooking of the food product being conveyed through the enclosure.

In accordance with one aspect of the invention, the collar is of a length between one-half the pitch length and the full pitch length of the blades, that is, the dimensional component thereof in the axial direction. Furthermore, at least one-half of the pitch length of the blades is disposed within the collar. The above relationship has been found to result in very effective air flow with a minimum of air flow reversal space required.

The orientation of the fan is reversed from that used previously in that the concave side of the hub member faces forwardly toward the plenum. Furthermore, the blades are flat members which are oriented at about 17° to 45° angles relative to the plane perpendicular to the axis of rotation wherein the lines about which they are turned are generally radial. The blades are also tilted at about 2° to 15° generally rearwardly relative to the plenum around imaginary lines coplanar with the blades and oriented 35° to the aforementioned plane. It has been found that an impeller having this structure is very effective in terms of air flow velocity and space needed for air flow reversal.

An object of the present invention is to conserve energy in the cooking process by efficiently recycling the air within the enclosure for reheating and subsequent use for cooking.

A further object of the present invention is to provide a unique structural combination of a plenum, impeller, and shroud which supplies heated air in a uniform manner to a series of ducts through which the heated air passes for cooking foods conveyed through the enclosure.

A still further object of the present invention is to cause a non-turbulent reversal in the flow of the air back into the plenum in a short distance.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
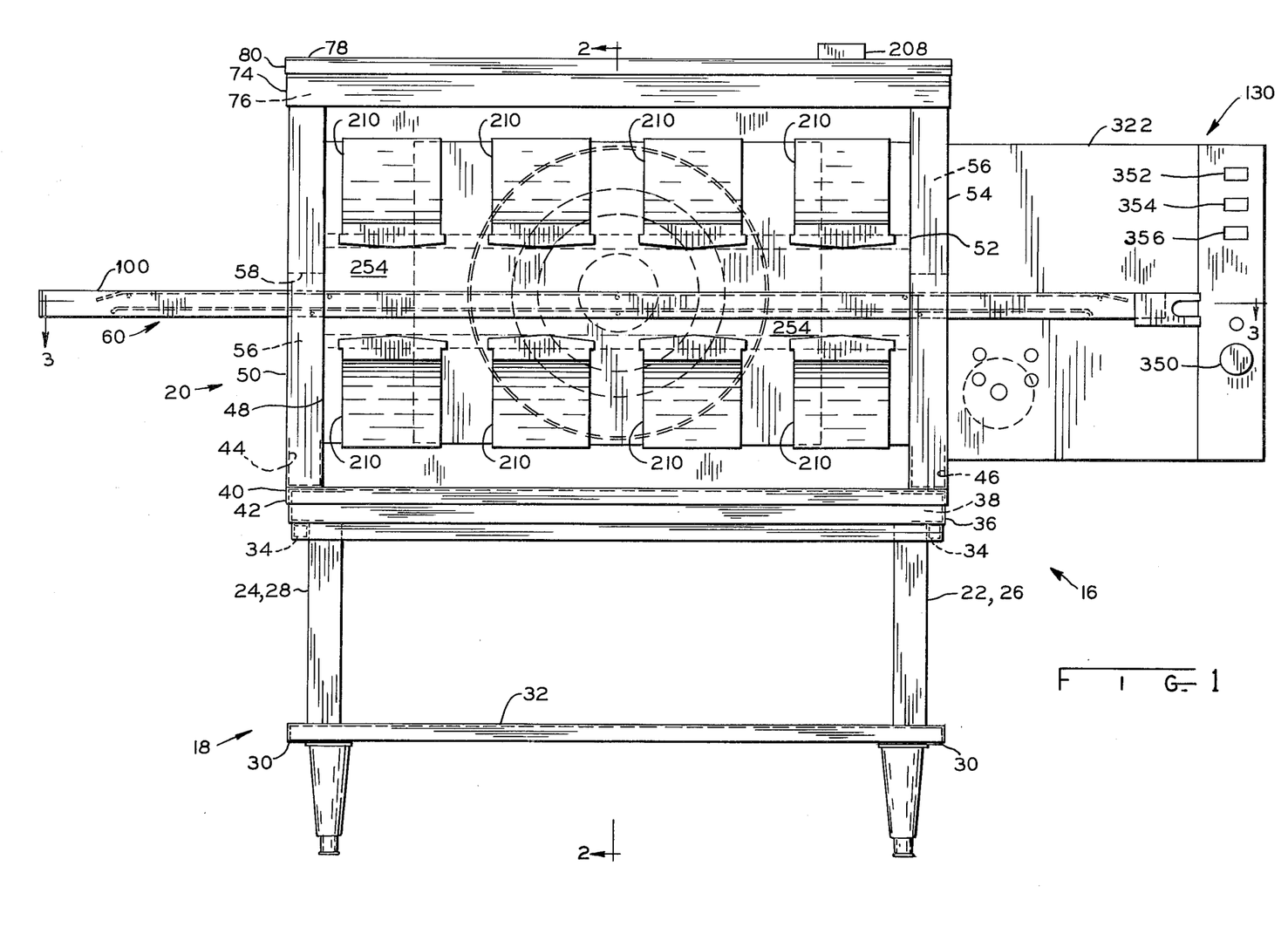
FIG. 1 is a front elevational view of a preferred embodiment of the present invention.
Figure 2:
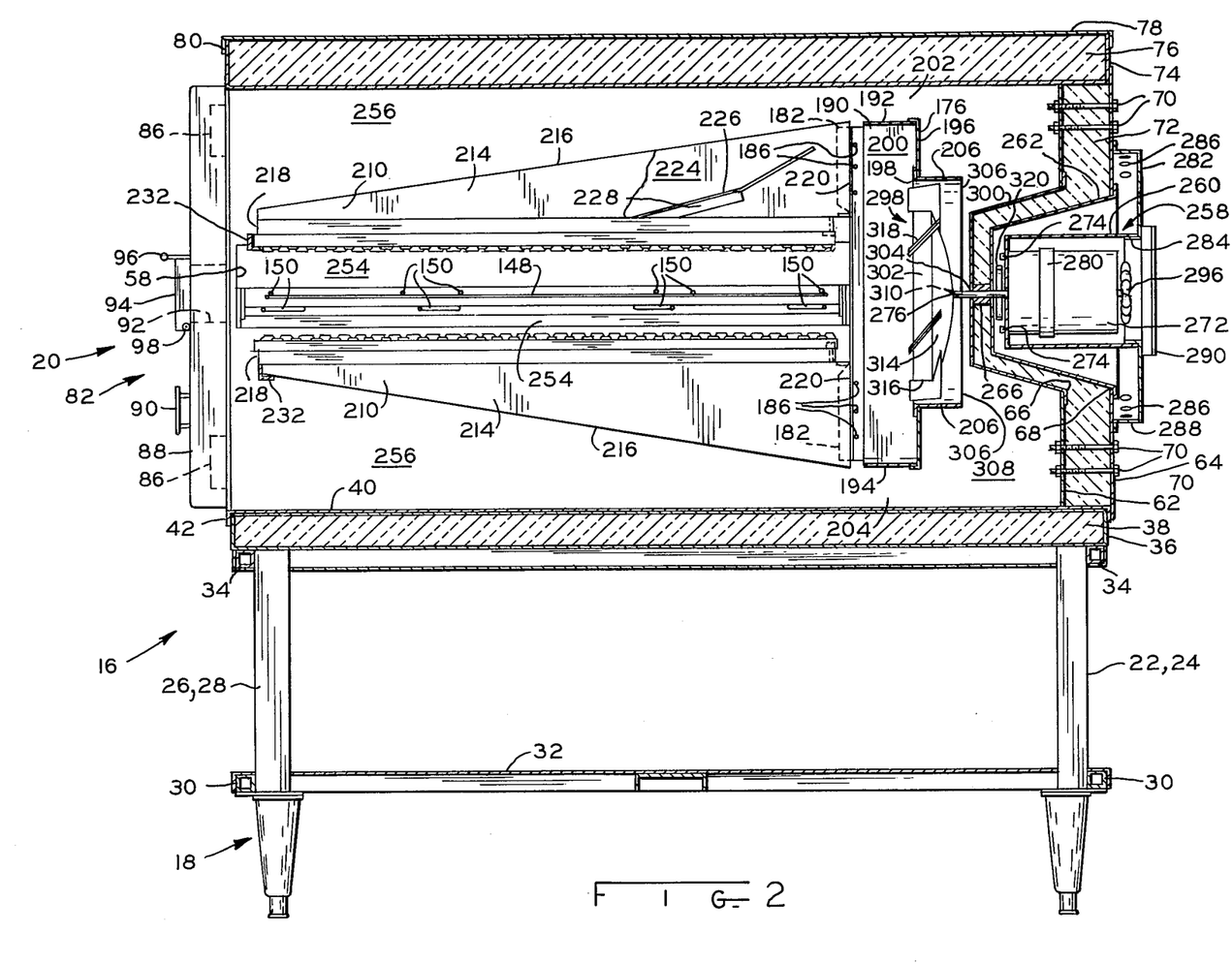
FIG. 2 is a sectional view of FIG. 1 along line 2—2 and viewed in the direction of the arrows.

Referring to FIGS. 1 and 2, food preparation apparatus 16 of the present invention is illustrated with stand assembly 18 and cabinet assembly 20. Stand assembly 18 comprises four leg members 22, 24, 26, 28, which may be made of square tubular stainless steel, secured within a bottom frame 30, which also may be made of tubular stainless steel. Leg members 22, 24, 26, 28 are secured within respective corners of bottom frame 30 in any suitable manner such as by welding. Bottom frame 30 further has shelf 32 secured thereto, by welding for example. Secured to the top ends of leg members 22, 24, 26, 28, again preferably by welding, is top frame 34, also preferably made of tubular stainless steel. Placed upon top frame 34 is bottom insulation housing 36 containing any suitable insulation material 38 therein. Parenthetically, unless otherwise indicated, further securements or connections may be made in any suitable manner, but are preferably made by welding.

Figure 3:
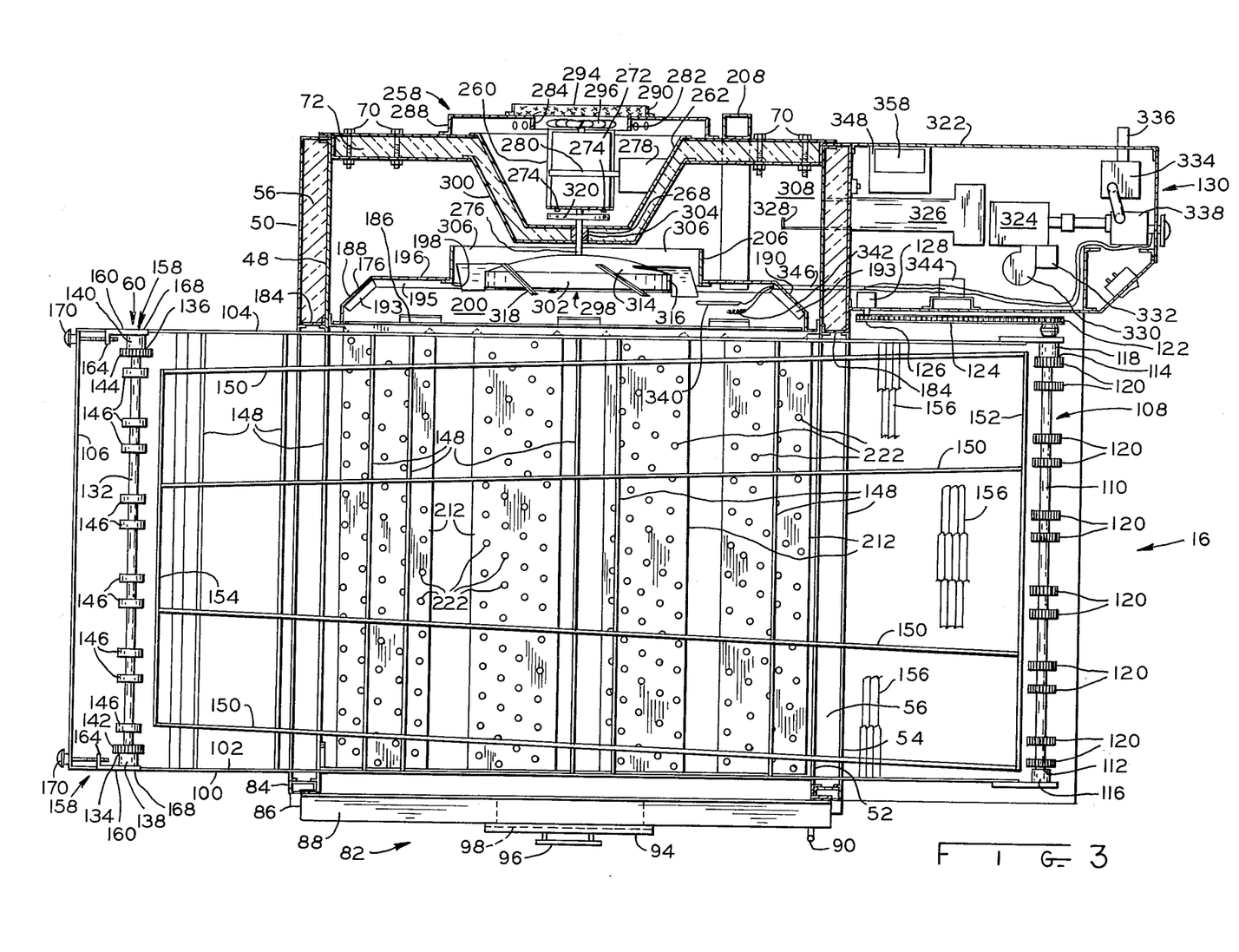
FIG. 3 is a sectional view of FIG. 1 along line 3—3 and viewed in the direction of the arrows.
Figures 4, 5:
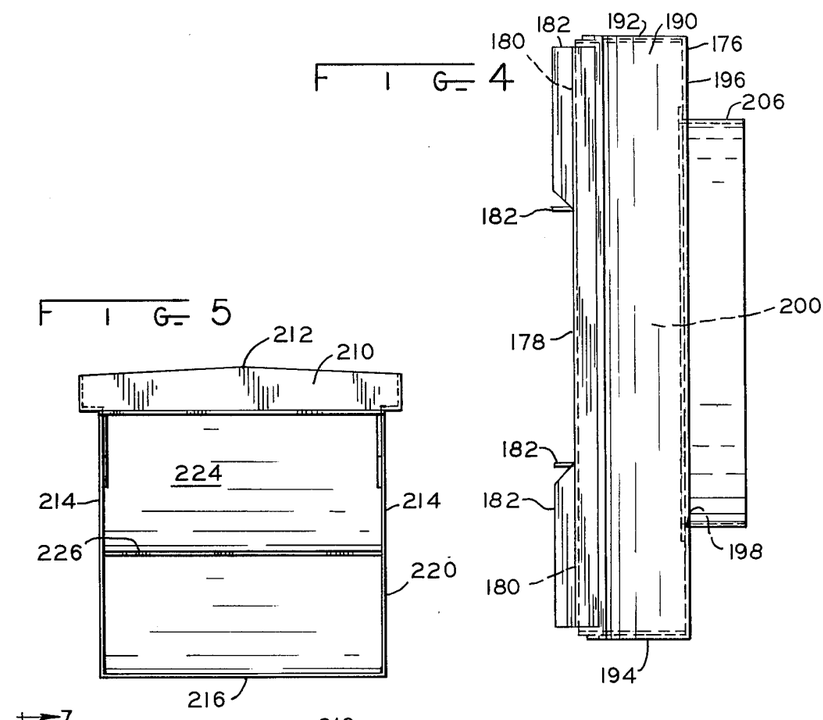
FIG. 4 is a side elevational view of a plenum of a preferred embodiment of the present invention.
FIG. 5 is an end elevational view of a duct of a preferred embodiment of the present invention.

Referring now to FIGS. 1, 2 and 3, cabinet assembly 20 comprises base cap 40 set upon bottom insulation housing 36 and secured thereto by base cap skirt 42, which extends downwardly from the periphery of base cap 40 and over bottom insulation housing 36 such that skirt 42 is contiguous therewith. Base cap 40 may be made by stamping a stainless steel sheet and then welding the corners together in order to form skirt 42. Two connecting, U-shaped channel brackets 44, 46 are secured along respective longitudinal edges of base cap 40, with channel bracket 44 having inner wall 48 and outer wall 50 connected thereto and channel bracket 46 having inner wall 52 and outer wall 54 connected thereto. Inner wall 48 and outer wall 50 are riveted to channel bracket 44, while inner wall 52 and outer wall 54 are riveted to channel bracket 46. Each of the walls 48, 50, 52, 54 is made of stainless steel sheeting, and insulation material 56 is disposed between inner wall 48, outer wall 50 and inner wall 52, outer wall 54. A passageway 58 is also horizontally disposed through walls 48, 50, 52, 54 so that conveyor assembly 60 may be received therethrough.

The rear portion of cabinet assembly 20 comprises an inner wall 62 and an outer wall 64, which have their bottom edges secured to base cap 40 and their side edges secured to inner walls 48, 52, and are further strengthened for supporting other assemblies by fasteners such as nut and bolt assemblies 70 received through holes (not shown) in walls 62, 64. Walls 62, 64 also have openings 66, 68 disposed therethrough, respectively, with opening 66 having a slightly larger diameter than opening 68, and an insulation material 72 is positioned between walls 62, 64 for energy conservation.

The top portion of cabinet assembly 20 comprises top insulation housing 74 having insulation material 76 therein and which is secured to walls 48, 50, 52, 54 by welding, riveting, or the like. Placed on top of insulation housing 74 is top cap 78, which has skirt 80 extending downwardly from its periphery and contiguous with the sides of insulation housing 74. Housing 74 and top cap 78 are preferably made of stainless steel sheeting.

The interior of cabinet assembly 20 is accessible by door assembly 82. Door assembly 82 comprises elongated hinge frame 84, which is secured along the forward edges of inner wall 48, outer wall 50 and which has secured thereto hinge 86. Hingedly connected to hinge 86 is door 88, which has handle 94 permitting door 88 to be opened and closed, and has door opening 92 disposed therein for allowing quick, easy access to the interior of cabinet assembly 20. Access door 94 having an access door handle 96 is hingedly connected to the bottom periphery of door opening 92 by access door hinge 98. One of the purposes of access door 94 is to allow the insertion or removal of certain foods within cabinet assembly 20, and in order to facilitate such purpose access door 94 may be provided with a window made of a transparent material. Neither door 88 or access door 94 utilize a gasket to seal with the front of cabinet assembly 20 or door opening 92, respectively. Doors 88, 94 are constructed and machined such that the metal-to-metal seal is sufficient for energy conservation purposes.

Reference should be made now to FIGS. 1, 2, 3, 8, and 9 for a description of conveyor assembly 60. Conveyor frame 100 is received through cabinet passageway 58 and removably mounted to walls 48, 50, 52, 54 and has opposite sides 102, 104 with end 106 extending between and connected to sides 102, 104 and shaft assembly 108 extending between the opposite ends of sides 102, 104. Shaft assembly 108 comprises a horizontally disposed shaft 110 having shaft journal ends 112, 114 rotatably received within journal hubs 116, 118, respectively, which are secured to sides 102, 104, respectively. Shaft 110 has a plurality of drive gears 120 secured thereto for driving a conveyor belt mounted within conveyor frame 100, while shaft journal end 114 is rotatably received through frame side 104 in order to support drive sprocket 122, which is connected thereto. Shaft 110 carrying drive gears 120 thereon is rotated by chain 124 engaging drive sprocket 122 and sprocket 126, which is operated by motor 128 located within control center 130.

Extending between sides 102, 104 of conveyor frame 100 and opposite shaft assembly 108 is horizontally disposed idler shaft 132 having journal ends 134, 136 rotatably received within journal hubs 138, 140, respectively, which are slidably mounted to sides 102, 104, respectively. On either end of idler shaft 132 and inwardly adjacent to journal ends 134, 136 are drive gears 142, 140, respectively, which are similar to drive gears 120. Extending the length of idler shaft 132 between drive gears 142, 144 are a plurality of blank gears 146 about which a conveyor belt may be disposed. Further support for a conveyor belt is provided by two rows of a plurality of cross rods 148 extending between and secured to frame sides 102, 104, and two rows of a plurality of support rods 150 placed upon and secured to cross rods 148 and which generally extend a portion of the length of conveyor frame 100. The ends of support rods 150 are maintained in a spaced apart relation and supported by rod ends 152, 154 secured thereto. FIGS. 1, 2 and 3 more clearly show the two vertically spaced planes defined by the interconnecting cross rods 148 and support rods 150, while FIG. 3 illustrates the support rods 150 tapering inwardly from shaft assembly 108 to idler shaft 132 for assisting drive gears 142, 144 in centering and tracking a conveyor belt moving upon support rods 150.

A preferred conveyor belt is a wire-link conveyor belting 156, which is placed over shaft 110 and idler shaft 132 and upon the two planes of support rods 150 such that drive gears 120 of shaft 110 and drive gears 142, 144 of idler shaft 132 engage and drive belting 156 upon chain 124 and sprocket 126 being actuated by motor 128.

The slack or tension of belting 156 about shaft assembly 108 and idler shaft 132 may be adjusted by adjusting mechanism 158 located on conveyor frame end 106. Particularly referring to FIGS. 8 and 9, a single adjusting mechanism 158 is illustrated at the juncture of frame end 106 and frame side 102, and since an identical adjusting mechanism 158 is located at the juncture of frame end 106 and frame side 104 only one such adjusting mechanism 158 will be described. As earlier explained, journal end 134 of idler shaft 132 is rotatably received within journal hub 138, which is secured to L-shaped bracket 160. L-shaped bracket 160 has a bracket side 162 which engages with and conforms to the inner surface of frame side 102, a bracket end 164 perpendicularly connected to an end of bracket side 162 and with threaded hole 166 disposed therethrough, and a flange 168 perpendicularly disposed along the top edge of bracket side 162 and engaging with and conforming to the top edge surface of frame side 102 for supporting L-shaped bracket 160 thereon. Also provided with adjusting mechanism 158 is adjusting knob 170 having a threaded portion 172 receivable through frame end hole 174 and threadedly engaged through hole 166. With an identical adjusting mechanism 158 positioned on the opposite end of frame end 106, the slack or tension of belting 156 may be adjusted by operating adjusting knob 170 counterclockwise or clockwise in order to slide L-shaped bracket 160 along frame side 102. L-shaped brackets 160 are prevented from being sidetracked or bounced off of frame side 102 by the weight of idler shaft 132 and belting 156 on flange 168.

For visual appeal, conveyor guards (not shown) may be mounted about conveyor frame 100 in order to hide from view the operating parts of conveyor assembly 60 and adjusting mechanisms 158. It should also be obvious that conveyor assembly 60 may be adapted to other conveyor systems or work benches in order to provide further flexibility of preparing food products, but in any event, it is preferable that conveyor assembly 60 extend outwardly from passageway 58 a sufficient distance in order to allow a food product to be properly positioned upon belting 156 for conveyance through cabinet assembly 20 and removed from the opposite end of conveyor assembly 20.

Figure 15:
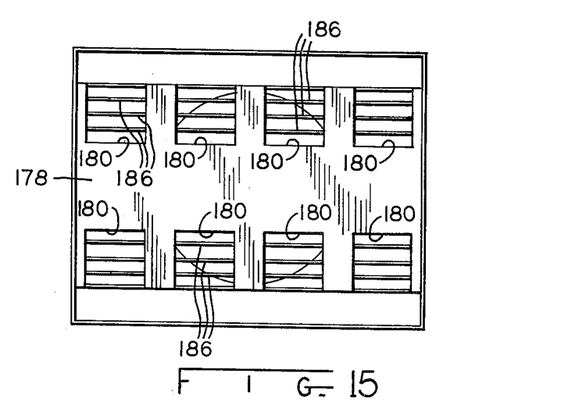
FIG. 15 is a front elevational view of the interior of a preferred embodiment of the present invention with the finger ducts, and impeller and motor assemblies removed.

Referring now to FIGS. 2, 3, 4, 14 and 15, plenum 176 has a plenum front wall 178 connected to inner walls 48, 52, by welding, pop riveting or any other suitable manner. In FIGS. 2 and 15, it can be seen that front wall 178 has a vertical dimension less than the interior vertical dimensions of cabinet assembly 20 and a plurality of openings 180 disposed therethrough, each of which has flanges 182 peripherally disposed thereabout. Front wall 178 may be stamped from a sheet material such as stainless steel. Side supports 184 are placed between and secured to inner wall 48, outer wall 50, and inner wall 52, outer wall 54, in order to provide additional support for plenum 176 and other assemblies described hereinafter, and a plurality of such side supports 184 may be positioned at other points for additional structural integrity. A grating 186 having a surface area substantially the same as front wall 178 is positioned against front wall 178 on a side opposite flanges 182 for purposes of protection while cleaning the plenum 176. Attached to the side edges of front wall 178, or to inner walls 48, 52 at the point of juncture with front wall 178, are plenum sides 188, 190, both of which taper inwardly at their rearward portions. Plenum 176 also has top wall 192 and bottom wall 194 secured to plenum sides 188, 190, for example, by welding or pop riveting top wall 192 and bottom wall 194 to flanges 193 disposed inwardly along the top and bottom peripheries of plenum sides 188, 190; and has back wall 196 secured to the peripheries of plenum sides 188, 190 and top and bottom walls 192, 194 in a similar manner utilizing back wall flanges 195. Hole 198, which is centrally disposed through back wall 196, and openings 180 provide air flow into and out of plenum chamber 200, which is formed by front wall 178, sides 188, 190, top and bottom walls 192, 194, and back wall 196. In addition, top wall 192 and top insulation housing 74, and bottom wall 194 and bottom insulation housing 36, form therebetween passageways 202, 204, respectively. An important feature associated with plenum 176 and the air flow within cabinet assembly 20 is collar 206, which extends axially along the periphery of back wall hole 198 a predetermined distance. Its purpose and the manner in which it fulfills that purpose will be described hereinafter. To allow escape of combustion and other foreign particles within cabinet assembly 20, flue 208 is provided and communicates with plenum chamber 200 and the atmosphere external of cabinet assembly 20. Again, all of the elements associated with plenum 176 are preferably made of stainless steel sheeting.

Referring now to FIGS. 1-5, 10-13, and 15, duct fingers 210 will be described, which description may be found in more detail in U.S. Pat. No. 4,154,861 incorporated herein by reference. Generally, each finger 210 comprises a jet plate 212 slidably received between two generally triangularly shaped sides 214, which are connected to a sloping side 216, whereby fingers 210 have a tapering shape from front end 218 to back end 220. Fingers 210 are preferably made of stainless steel sheeting, and sides 214 and sloping side 216 may be stamped out of a single stainless steel sheet. Jet plate 212 has a plurality of jet openings 222 disposed therein to provide communication between finger chamber 224 and the interior of cabinet assembly 20. Openings 222 are formed such that the high velocity air exits in a jet stream, and additional jet plates (not shown) may be slidably received within finger chamber 224 in order to define more precisely the jet air streams exiting openings 222. Naturally, additional jet plates 212 having openings 222 would be positioned within finger chamber 224 such that openings 222 of each jet plate 212 would be vertically aligned with other respective openings 222. Referring to FIGS. 2 and 15, positioned within each finger chamber 224 is deflector 226. Each deflector 226 has a width approximately equal to the interior width of finger 210 and has one end spot welded within finger chamber 224 to sides 214. Each deflector 226 has a pair of flanges 228 extending from its side edges toward jet plate 212 from the front edge of deflector 226, which is secured to sides 214, to a point approximately midway along deflector 226. This portion of deflector 226 is stationary, while the remaining portion is movable in order to apportion the incoming air flow within chamber 224. As can be seen in FIG. 2, deflector 226 has its front edge secured to sides 214 at a point approximately one-third of the distance from back end 220. Without deflectors 226, air leaving plenum chamber 200 and entering finger chamber 224 would move directly to the front portion of the fingers 210 due to its high velocity. In order to prevent this occurrence, each deflector 226 deflects a portion of the incoming air flow through those openings 222 which lie in the back one-third portion of each finger 210. This permits the heated, high velocity air to exit all openings 222 in a uniform distribution across jet plate 212 in order to evenly cook food products carried by conveyor assembly 60.

Referring now to FIGS. 1 and 15, openings 180 of plenum front wall 178 are disposed therein such that upon finger back ends 220 being positioned thereagainst, fingers 210 extend horizontally about the portion of conveyor assembly 60 within cabinet assembly 20; specifically, four of the fingers 210 are spaced above and four of the fingers 210 are spaced below that portion of conveyor assembly passing through cabinet assembly 20. This arrangement allows the food product being carried by conveyor assembly 60 to be evenly cooked in a shorter period of time due to the impingement of the heated, high velocity air exiting openings 222 of jet plates 212.

Figures 10, 11, 12, 13:
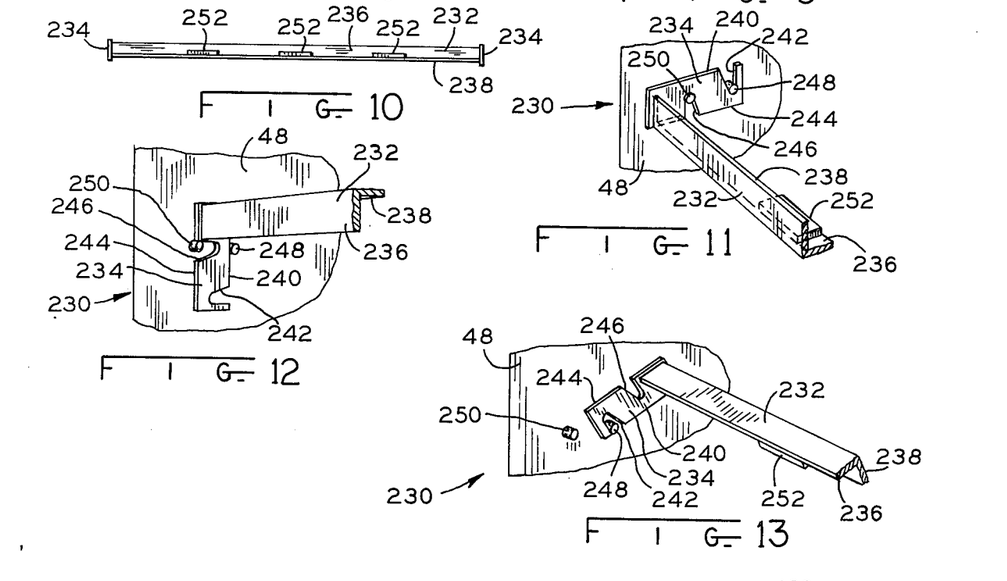
FIG. 10 is an elevational view of a finger bracket of a preferred embodiment of the present invention.
FIG. 11 is a partially broken-away, perspective view of an end of a finger bracket depicting its connection to a side of a preferred embodiment of the present invention.
FIG. 12 is a partially broken-away, perspective view of an end of a finger bracket illustrating its position for removal or installation to a side of a preferred embodiment of the present invention.
FIG. 13 is a partially broken-away, perspective view of an end of a finger bracket illustrating the initial position for installing it to a side of a preferred embodiment of the present invention.
Figure 14:
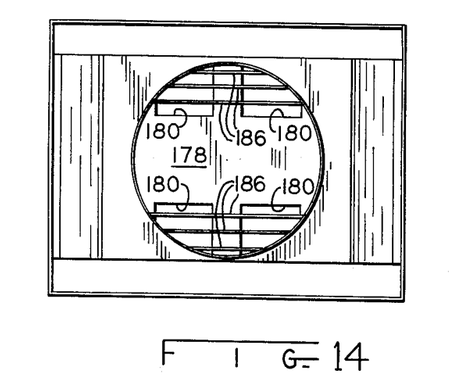
FIG. 14 is a rear elevational view of the interior of a preferred embodiment of the present invention with the impeller and motor assemblies removed.

While the specific construction of fingers 210 may be found in U.S. Pat. No. 4,154,861, the connection of fingers 210 within cabinet assembly 20 is unique to the present invention. Referring in particular to FIGS. 2, 3, 4, 5, 10-13 and 15, each opening 180 within plenum front wall 178 has flanges 182 extending outwardly therefrom, which support a finger back end 220 by fitting back end 220 about flanges 182 so that the outer surfaces of flanges 182 are contiguous with the inner surfaces of finger back end 220. Finger front ends 218 are supported by a finger support assembly 230 claimed in a copending application (FIGS. 10-13). Two finger support assemblies 230 are required, one for the top four fingers 210 and one for the bottom four fingers 210, portions of which are depicted in FIG. 2. Finger support assembly 230 comprises finger bracket 232 extending generally horizontally between inner walls 48, 52 and having bracket ends 234 disposed thereon. When installed, finger bracket 232 has horizontal edge 236 and vertical side 238 for supporting finger front ends 218 thereon. The primary novelty of finger support assemblies 230 resides in the structure by which finger bracket 232 and bracket ends 234 may be removed by hand from inner walls 48, 52. FIGS. 11-13 depict only a portion of finger bracket 232 having a single bracket end 234 thereon, and only that portion will be described since the opposite end is identical thereto. Bracket end 234 has a top edge 240 with a shaped slot 242 therein and bottom edge 244 with shaped slot 246 therein; slot 242 being a greater distance from bracket 232 than slot 246. Slots 242, 246 taper outwardly toward their respective edges for installation purposes. Secured to inner wall 48 are two studs, inner stud 248 and outer stud 250. FIG. 11 depicts finger bracket end 234 installed with studs 248, 250 received within slots 242, 246, respectively. In order to remove finger bracket 232 manually, finger bracket 232 is rotated about a point on bracket end 234 generally midway between slots 242, 246 to a position depicted in FIG. 12. Thereafter, finger bracket 232 may be vertically or horizontally drawn between studs 248, 250 for removal and cleaning. The initial step in reinstalling finger bracket 232 is depicted in FIG. 13 wherein finger bracket 232 is rotated to a position as shown so that inner stud 248 begins to be received by slot 242. At this point, as depicted in FIG. 13, finger bracket 232 is then rotated toward the operator so as to engage outer stud 250 with slot 246, as depicted again in FIG. 11. Finger bracket 232 is designed to be manually removed for cleaning in accordance with NSF (National Sanitation Foundation) Standard 2, which requires that such parts of food preparation apparatuses be removable without the use of other tools. Once installed, as depicted in FIGS. 2 and 11, finger front ends 28 are supported by horizontal edge 236 and vertical side 238, and individual front ends 218 of fingers 210 are maintained in a spaced apart relation by three spacers 252 welded upon horizontal edge 236. The number of spacers 252 required is a direct function of the number of fingers 210 such that for every n number of fingers there is n−1 number of spacers. As described above, an individual finger 210 is removably supported at its back end 220 by flanges 182 of plenum 176 and at its front end 218 by finger bracket 232.

In order to provide flexibility in preparing certain food products, closeoff caps (not shown) may be utilized on the finger back ends 220 in order to prevent heated, high velocity air flow from entering finger chambers 224. For example, should a food product require only top surface heating, four close-off plates would be utilized on the four fingers 210 beneath conveyor assembly 60, or, if a food product requires both top and bottom surface heating for only a short period of time, closeoff plates may be utilized on the first two fingers 210 above and the first two fingers 210 below conveyor assembly 60.

With the above description of fingers 210 within cabinet assembly 20, two additional chambers are formed, the first being cooking chamber 254 defined between the four top fingers 210 and the four bottom fingers 210 and through which conveyor assembly 60 passes, and the second being return chamber 256 defined between fingers 210, inner walls 48, 52, insulation housings 36, 74, and door 88, the functions of which will be described hereinafter.

Motor assembly 258 will now be described with reference to FIGS. 2 and 3. Secured to the periphery of opening 68 of outer wall 64, by welding or pop riveting, for example, is a frustoconically shaped interior shroud 262 having hole 266 centrally disposed therethrough. Secured through hole 266 is isolator tube 268. Motor 272 is mounted on motor bracket 260 by four studs 274 and has shaft 276 rotatably received through hole 266. Further support of motor 272 is provided by angle offset bracket 278, which is spot welded to a side of interior shroud 262, and band 288 received through angle offset bracket 278 and secured about motor 272. Band 280 and angle offset bracket 278 serve to dampen linear and torsional stresses set up by the starting and rotating torques of motor 272.

Cylindrically-shaped motor shroud 282 is concentrically secured about motor 272 to motor bracket 260 and rear shroud 288, by welding or pop riveting for example, and has an opening 284 centrally disposed therethrough with a diameter greater than the width or diameter of motor 272 and vents 286 disposed through the upper and lower portion of rear shroud 288. Concentrically mounted about motor shroud opening 284 and secured to rear shroud 288 is fan shroud 290. A vent 294 is provided at the top and bottom of fan shroud 290, and a fan 296 is rotatably connected to motor shaft 276, whereby, upon motor 272 being actuated, fan 296 draws outside air through vent 294 and motor shroud opening 284 for cooling motor 272 and subsequent exhausting through vents 286 in rear shroud 288.

Referring now to FIGS. 2–4, 6, 7 and 14, impeller assembly 298 comprises in major part impeller shroud 300 and impeller 302. Impeller shroud 300, like shroud 262, is formed by spinning a stainless steel sheet into a frusto-conical shape, and is connected to inner wall opening 66, by welding or pop riveting, such that it encompasses interior shroud 262. Motor shaft 276, which is rotatably received through isolator tube 268, is also rotatably received through impeller shroud hole 304, which is centrally disposed through the flat surface portion of impeller shroud 300, and insulation material 72 fills the space defined between impeller shroud 300, interior shroud 262, and isolator tube 268. As seen in FIGS. 2 and 3, impeller shroud 300 extends toward the space defined by collar 206 thereby defining therebetween passageway 306, which allows communication between heat chamber 308 and plenum chamber 200.

Shaft 276, which extends within collar 206, has connected to its end portion impeller 302 by split shaft bushing 310 or an equivalent thereof. Impeller 302 is made of spun stainless steel and, referring to FIGS. 6 and 7, has flat center portion 312, a convexly-shaped surface area 314 extending from flat center portion 312, and skirt 316, which extends from the periphery of domed surface area 314 and is substantially parallel to the axis of impeller 302. Important to the results obtained by impeller assembly 298 is the positioning of impeller 302 in relation to collar 206 and plenum 176. Generally, at least one-half of the pitch length of 302 is positioned within collar 206 in order to obtain good air flow distribution.

Figure 6:
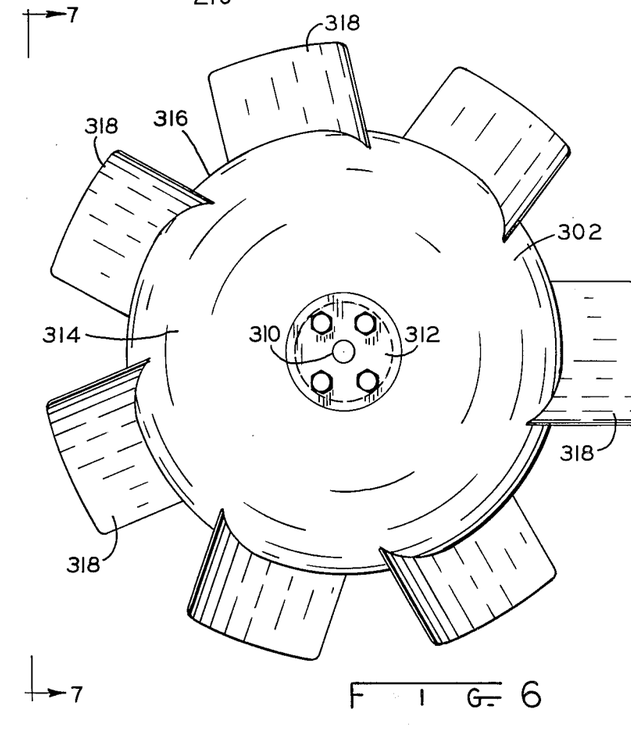
FIG. 6 is a front elevational view of an impeller of a preferred embodiment of the present invention.
Figure 7:
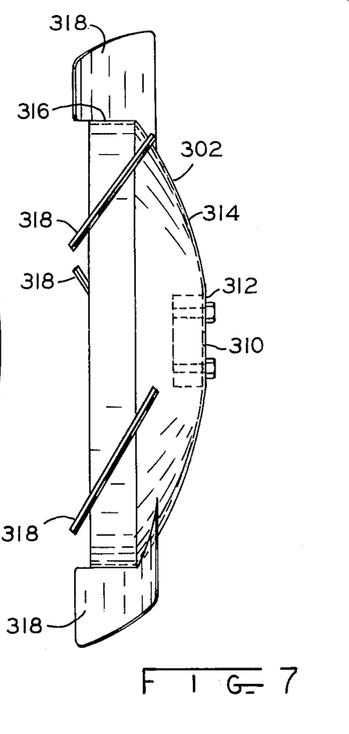
FIG. 7 is a side elevational view of the impeller of FIG. 6.
Figure 8:
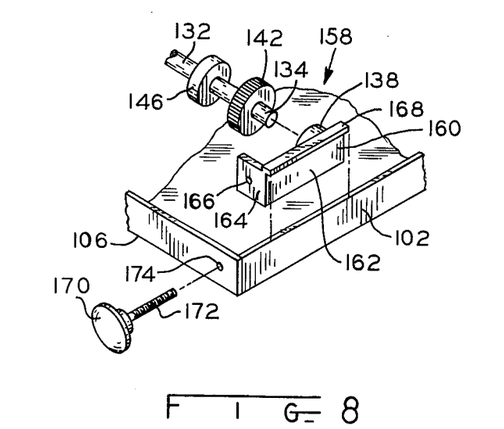
FIG. 8 is an exploded view of the adjusting mechanism of a preferred embodiment of the present invention.
Figure 9:
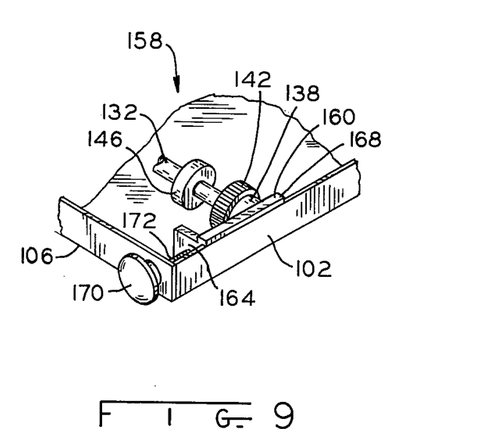
FIG. 9 is a perspective view of the adjusting mechanism of FIG. 8.

Blades 318 have a flat surface and are welded, riveted, or spot welded to impeller 302 such that blades 318 form an angle of approximately 17°–45° with a vertical plane, and are tilted opposite the direction of rotation of impeller 302, which rotates clockwise relative to the position of motor assembly 258. The angle of tilt of blades 318 is generally between 2° and 15°, and, as seen in FIG. 6, there are seven blades 318. Impeller shroud 300 and collar 206 direct the air flow through passageway 306 in a path substantially parallel to the side of the impeller shroud 300. The frusto-conical shape of impeller shroud 300 provides smooth, continuous air flow, thereby eliminating any dead spots or stagnant air pockets within heat chamber 308. The air is thereafter drawn by impeller 302 through passageway 306 for uniform distribution through plenum 200 to fingers 210. The uniform distribution of heated, high pressure air is provided by domed surface area 314 of impeller 302, which smoothly directs the air flow axially and radially to blades 318 for further axial and radial distribution through plenum 200 to fingers 210. In addition to the axial, radial distribution of air by impeller 302, it further reduces air buffeting and noise associated with spider-type fans.

FIGS. 2 and 3 illustrate impeller 302 positioned on shaft 276 such that domed surface area 314 faces toward motor assembly 258, in accordance with the present invention. Best results and smoothest air flow are obtained when impeller 302 is positioned as indicated in FIGS. 2 and 3.

Heat conductor 320 is connected to and rotates with shaft 276 between interior shroud 262 and motor bracket 260. Heat conductor 320 is preferably made of material such as aluminum, which absorbs heat energy from shaft 276 and distributes it out through rear shroud vents 286.

Referring now to FIGS. 1 and 3, control 130 of the present invention will be explained. The control components are housed in control center housing 322, which is secured, by welding or pop riveting, to outer wall 54 of cabinet assembly 20. Positioned within control center housing 322 is burner head 324 and burner housing 326, which supply and direct the flame to heat chamber 308, where flame shaper 328 forms the flame into an appropriate shape. The flame is located within the bottom portion of heat chamber 308 and has its heat energy drawn transversely across heat chamber 308 by impeller 302 for reheating recirculated air flow. Other elements, for example, orifices and gas piping, are not illustrated since they are conventionally associated with power gas burners. Air is supplied to burner head 324 by burner fan 330 controlled by burner control 332, which regulates the temperature of the heat source within heat chamber 308. In order to regulate the temperature of the heat source within heat chamber 308, burner control 332 is connected to electric valve 334, which is turn is connected to gas inlet pipe 336 and modulating control 338. Electric valve 334 is a conventional-type valve and supplies gas flow to modulating control 338, which regulates the gas flow supply to burner head 324. Modulating control 338 is able to mechanically regulate gas flow to burner head 324 by inputs received from thermostat bulb 340, which is located within plenum chamber 200. Thermostat bulb 340 is able to sense the temperature of the rapid air movement within plenum chamber 200 and to provide input to modulating control 338. Upon receiving inputs from thermostat bulb 340, modulating control 338 is adjusted in order to provide the appropriate amount of gas for burner head 324 in order to maintain the desired temperature within heat chamber 308. Furthermore, because of the sensitivity of thermostat bulb 340, the rapid turnover of heated air within heating chamber 308 and gas flow adjustments to burner head 324 are able to be quickly made in order to maintain a desired cooking temperature within cooking chamber 254.

A safety device for the air heating source is air switch 344, which senses the air pressure in plenum chamber 200 through tube 346 which communicates therebetween. If, for some reason, impeller 302 would not be rotating during operation of motor 272, air switch 344 would sense decreased air pressure within plenum chamber 200 and cause burner 324 to shut down.

Earlier, motor 128 was described as providing variable speed to wire-link conveyor belting 156. This regulation is provided by motor control 348, which is controlled by conveyor speed control switch 350. Since motor 128 is preferably a DC shunt wound type motor, it requires an AC-DC convertor such as motor control 348.

On/off switches are provided on the front of control center housing 322, and they are impeller switch 352, burner switch 354, and conveyor switch 356. A safety feature incorporated with control center 130 is relay 358, which is connected to impeller switch 352. In order to provide electrical power to control center 130 and the components therein, impeller switch 352 must first be placed to the on position in order to actuate relay 166, which in turn supplies power to the remainder of the control components. Alternate heat sources are naturally available to the present invention, and a gas power burner is not intended to be a limitation, for example, an electrical heat source is also adaptable to the invention in order to reheat recirculated air flow. Also, the present invention is described as having various elements made of stainless steel sheeting, however, other materials are also acceptable, such as aluminized steel or porcelainized steel.

Referring to FIG. 2, a description of the path of air flow during its recirculation within cabinet assembly 20 will be described. Initially, heated, high velocity air at a temperature of approximately 500° is jetted through jet plate openings 222 of fingers 210 to cooking chamber 254 for direct impingement on the bottom and top of a food product carried by conveyor assembly 60. After impinging the food product, the air flow circulates between fingers 210 into return chamber 256, from which it is drawn by impeller 302 through passageway 202, 204, into heating chamber 308. The recirculated air is then reheated within heating chamber 308 and rapidly drawn through passageway 306 to plenum chamber 200. The temperature within fingers 210 is generally within plus or minus 20° of plenum temperatures approximately 500° F., however, due to rapid air movement through fingers 210, the temperature of the air impinging the food product is generally 500° F. plus or minus 4°. To reiterate an important feature of the present invention, the air flow entering heat chamber 308 is drawn through passageway 306 by impeller 302 in a path substantially parallel to the side of impeller shroud 300 by reason of collar 206 and impeller shroud 300. In order to provide the axial and radial air flow from an impeller such as impeller 302, a length of approximately two to three feet of direct air travel in front of impeller 302 is generally required. The present invention eliminates that requirement of a two to three foot length in front of impeller 302 by providing collar 206, impeller shroud 300, and plenum 200, which perform the same function within a space of approximately four to six inches.

While this invention has been described as having a specific embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. An impingement food preparation apparatus comprising:
   an enclosure defining a chamber for receiving a food product therein,
   means for supporting a food product within the chamber,
   a plurality of duct means mounted within said chamber and spaced apart from said means for supporting a food product and including a plurality of nozzles therein spaced and positioned to form a plurality of streams of air for impingement on the food product on said means for supporting, a plenum disposed within said enclosure and connected to said duct means to provide air to said duct means, said plenum having a front portion with a plurality of openings therein connected to said duct means and having a rear wall with a rear opening therein, a cylindrical collar connected to the rear wall of said plenum and positioned around said rear opening, said collar having a front edge which terminates substantially flush with said rear wall, said collar extending rearwardly beyond said plenum, impeller means positioned within said collar for drawing air from said chamber into said plenum through said collar, said impeller having a domed hub member and a plurality of blades that are oriented at a given angle of pitch, said blades being connected to said domed hub member, said collar having a length which is from about 50% to 100% of the pitch length of the blades in the axial direction, and at least one-half of the pitch length of the blades in the axial direction is disposed within said collar, a shroud having a surface that tapers radially outwardly in a direction away from said impeller, and which is in close proximity to and at least partially rearwardly of said collar for directing air into said collar, and means in said enclosure for one of heating and cooling the air before it is drawn into said plenum through said rear opening.

2. The apparatus of claim 1 wherein said impeller hub member comprises a generally convex center portion and a cylindrical skirt portion extending therefrom, said hub member having a diameter less than the diameter of said rear opening of said plenum rear wall, said plurality of blades are angularly disposed on said skirt portion, and including motor means for rotating said skirt portion positioned rearwardly of said shroud.

3. The apparatus of claim 1 further including a flue having one end communicating with said plenum and an opposite end communicating externally of said enclosure.

4. The apparatus of claim 1 wherein said means for supporting a food product comprises conveyor means having a frame having opposite ends with a continuously movable belt positioned therebetween, and being receivably mounted through said enclosure passageway, and drive means for continuously moving said belt.

5. The apparatus of claim 1 wherein said plenum tapers inwardly from said plenum front portion to said plenum rear portion.

6. The apparatus of claim 1 wherein said means for one of heating or cooling is a gas burner.

7. The apparatus of claim 1 including an electric motor drivingly connected to said impeller hub member.

8. The apparatus of claim 1 including a temperature sensor means positioned in said plenum and connected to said means for one of heating or cooling.

9. An impingement food preparation apparatus comprising:

an enclosure defining a chamber for receiving a food product therein, means for supporting a food product within the chamber, a plurality of duct means mounted within said chamber and spaced apart from said means for supporting a food product and including a plurality of nozzles therein shaped and positioned to form a plurality of streams of air for impingement on the food product on said means for supporting, a plenum disposed within said enclosure and connected to said duct means to provide air to said duct means, said plenum having a front portion with a plurality of openings therein connected to respective said duct means and having a rear wall with a rear opening therein, a cylindrical collar connected to the rear wall of said plenum and positioned around said plenum rear opening, impeller means positioned within said collar for drawing air from said chamber into said plenum through said collar, said impeller means comprising a generally circular dome-shaped hub member connected to a drive member and having a diameter less than the diameter of said rear opening of said plenum, a plurality of blades angularly disposed on the periphery of said hub member with a given angle of pitch, said hub member being concave-shaped in a direction facing towards said plenum and convex in a direction facing away from said plenum, said collar having a length that is equal to at least one-half of the pitch length of said blades, and at least one-half of the pitch length of the blades in the axial direction being disposed in said collar, and means in said enclosure for one of heating or cooling the air before it is drawn into said plenum.

10. The apparatus of claim 9 wherein said plenum includes side walls which taper inwardly in a direction from said plenum front portion to said plenum rear wall.

11. The apparatus of claim 9 wherein said means for one of heating or cooling is a gas burner means for producing a flame in said enclosure.

12. The apparatus of claim 9 wherein said hub member includes a cylindrical side flange portion around the periphery thereof and extending forwardly toward said plenum.

13. The apparatus of claim 12 wherein said impeller means includes an electric motor having a drive shaft connected to said hub member.

14. The apparatus of claim 9 including a temperature sensor means positioned in said plenum and connected to said means for one of heating or cooling.

15. An impingement food preparation apparatus comprising:

an enclosure defining a chamber for receiving a food product therein, means for supporting a food product within the chamber, a plurality of duct means mounted within said chamber and spaced apart from said means for supporting the food product and including a plurality of nozzles therein shaped and positioned to form a plurality of streams of air for impingement on the food product on said means for supporting, a plenum disposed within said enclosure and connected to said duct means to provide air to said duct means, said plenum having a front portion with a plurality of openings therein connected to respective said duct means and having a rear wall with a rear opening therein, a cylindrical collar connected to the rear wall of said plenum and positioned around said plenum rear opening, rotatable impeller means positioned within said collar for drawing air from said cramber into said plenum through said collar, said impeller means comprising a dome-shaped hub member connected to a drive member and having a plurality of generally flat blades circumferentially disposed on the periphery of said hub member, each of said blades being turned about respective radii at pitch angles of about 17° to 45° relative to a plane perpendicular to the axis of rotation of the hub member and tilted 2° to 15° rearwardly relative to said plenum around respective lines oriented 35° to said plane and co-planar with said blades, and means in said enclosure for one of heating or cooling the air before it is drawn into said plenum, said collar having a length that is equal to at least one-half of the pitch length of said blades, and at least one-half of the pitch length of the blades in the axial direction being disposed in said collar.

16. The apparatus of claim 15 wherein said hub member is concave in a direction facing said plenum and convex in a direction facing away from said plenum.

17. The apparatus of claim 15 wherein said impeller means comprises an electric motor having an output shaft connected to said hub member.

* * * * *

UNITED STATES PATENT AND TRADEMARK OFFICE
CERTIFICATE OF CORRECTION

PATENT NO. : 4,462,383
DATED : July 31, 1984
INVENTOR(S) : Mitchell C. Henke, et al.

It is certified that error appears in the above—identified patent and that said Letters Patent is hereby corrected as shown below:

Col. 2, line 23, change "air" to --area--
Col. 3, line 45, change "at" to --art--
Col. 8, line 67, change "dimensions" to --dimension--
Col. 11, line 20, change "28" to --218--
Col. 13, line 33, change "is" first occurrence, to --in--
Cl. 15, Col. 17, line 5, change "cramber" to --chamber--

Signed and Sealed this

Eighteenth Day of December 1984

[SEAL]

Attest:

Attesting Officer

GERALD J. MOSSINGHOFF

Commissioner of Patents and Trademarks